United States Patent [19]

Eckel et al.

[11] 4,303,833
[45] Dec. 1, 1981

[54] NATURAL ENERGY OPERATED PUMP SYSTEM

[75] Inventors: John D. Eckel, Hazelgreen, Wis.; Amos M. Einerson, Ropesville, Tex.

[73] Assignee: A. Y. McDonald Manufacturing Company, Dubuque, Iowa

[21] Appl. No.: 166,108

[22] Filed: Jul. 7, 1980

[51] Int. Cl.³ .................................................. F04B 47/06
[52] U.S. Cl. ................................... 290/1 R; 417/244; 310/87; 60/641.8
[58] Field of Search .................... 290/1; 417/244, 246; 60/486, 428, 641; 310/87

[56] References Cited

U.S. PATENT DOCUMENTS

| 322,955 | 7/1885 | Moore | 417/246 |
| 2,434,804 | 1/1948 | Lagercrantz | 417/244 |
| 4,010,614 | 3/1977 | Arthur | 60/641 |

Primary Examiner—J. D. Miller
Assistant Examiner—D. L. Rebsch
Attorney, Agent, or Firm—Wegner, Stellman, McCord, Wood & Dalton

[57] ABSTRACT

A well water retrieval system for deep shaft wells including an electrical generator of limited generating capacity of the type that operates upon input of naturally occurring energy in wave or kinetic form as, for example, a photovoltaic generator. The system includes a plurality of electrically operated pumps each having an electrical energy demand not in excess of the generating capacity of the generator and a plurality of water reservoirs each sized to be disposed in a well shaft, there being a reservoir for most of the pumps. A conduit system supports the pumps and the reservoirs in a well shaft with the pumps and reservoirs stacked substantially vertically with the outlet of each pump connected to a reservoir higher in the stack and the inlet of each pump connected to an adjacent reservoir. A control is provided for operating the pumps selectively such that each pump drives water from its inlet to its associated higher reservoir to be elevated therefrom to another higher reservoir by another higher pump with the electrical energy demand of the operating pumps not exceeding the generating capacity. Consequently, a relatively small size generator may be utilized at a considerable cost saving.

11 Claims, 2 Drawing Figures

NATURAL ENERGY OPERATED PUMP SYSTEM

FIELD OF THE INVENTION

This invention relates to water retrieval systems, and more specifically, to water retrieval systems especially adapted for shaft-type wells and which operate on naturally occurring energy in wave or kinetic form.

BACKGROUND OF THE INVENTION

Over the years, there have been a large variety of proposals for the retrieval of water from wells that operate on naturally occurring energy. The most typical of such proposals is, of course, the windmill.

While in many instances, particularly where shallow wells are concerned, such proposals have operated satisfactorily, as the depth of the well increases, more work must be required to elevate water to the surface with the result that the apparatus or system necessary to form such elevation must necessarily increase in size. This, of course, increases the cost of the system.

Technological improvements over the years have in a variety of fields suggested that greater reliability of particular systems can be obtained by moving away from a wholly mechanical approach to one which minimizes the number of mechanical components involved. And at the same time, there is ever increasing concern for the conservation of energy and interest in economical utilization of naturally occurring forms of energy, particularly those in wave form such as sunlight and in kinetic form such as that contained in fluids undergoing movement due to natural causes.

These concerns have in turn resulted in considerable focus on electrical generation or conversion devices for converting such naturally occurring forms of energy into electrical energy as, for example, by photovoltaic cells or so-called "solar panels", wind driven generators and the like. While both in theory and in practice, state of the art technology is such that such generators can be employed to provide energy for the retrieval of water from wells, because energy requirements increase as the depth of the well increases, for many wells the cost of providing such an energy source with sufficient capacity to drive a large pump is so prohibitive as to make such a system thoroughly economically impractical though technically quite feasible.

SUMMARY OF THE INVENTION

The present invention is directed to overcoming one or more of the above problems.

According to the invention there is provided an electrical energy generator of limited generating capacity for generating electrical energy in response to the input of naturally occurring energy in wave or kinetic form, as, for example, from sunlight. There is further provided a plurality of electrical operated pumps each with an inlet and outlet and each having an electrical energy demand which is not in excess of the generating capacity of the generator. A plurality of water reservoirs are sized to be disposed in a well shaft with there being a reservoir for most of the pumps. Means support the pumps and the reservoirs in a well shaft with the same stacked substantially vertically and a conduit system is provided connecting the outlet of each pump to a reservoir higher in the stack and the inlet of each pump to an adjacent reservoir. Control means are provided for operating the pumps selectively such that each pump drives water from its inlet to its associated higher reservoir to be elevated therefrom to another, higher reservoir by another higher pump. The control means is such that the electrical energy demand of the operating ones of the pumps does not exceed the generating capacity.

Consequently, since each pump need not elevate liquid the entire depth of the well, relatively small pumps may be used and since the electrical energy demand of each pump is not in excess of that of the generating source, a very small generating source may be utilized without fear of its capacity being exceeded by demand in view of the operation of the control means.

While the provision of a plurality of small pumps may cost somewhat more than the provision of a single large pump, the difference in cost is more than off-set by the vastly decreased cost of the generator due to the ability of the system to utilize a small capacity generator.

According to a highly preferred embodiment of the invention, the support for stacking the pumps and reservoirs in the well consist essentially of conduits interconnecting the components. Means may be provided to prevent backflow in the conduits from one reservoir to a lower pump.

In a preferred form of the invention, the generator is a photovoltaic generator adapted to be exposed to sunlight.

Other objects and advantages will become apparent from the following specification taken in connection with the accompanying drawings.

DESCRIPTION OF THE PREFERRED EMBODIMENT

Figures 1, 2:
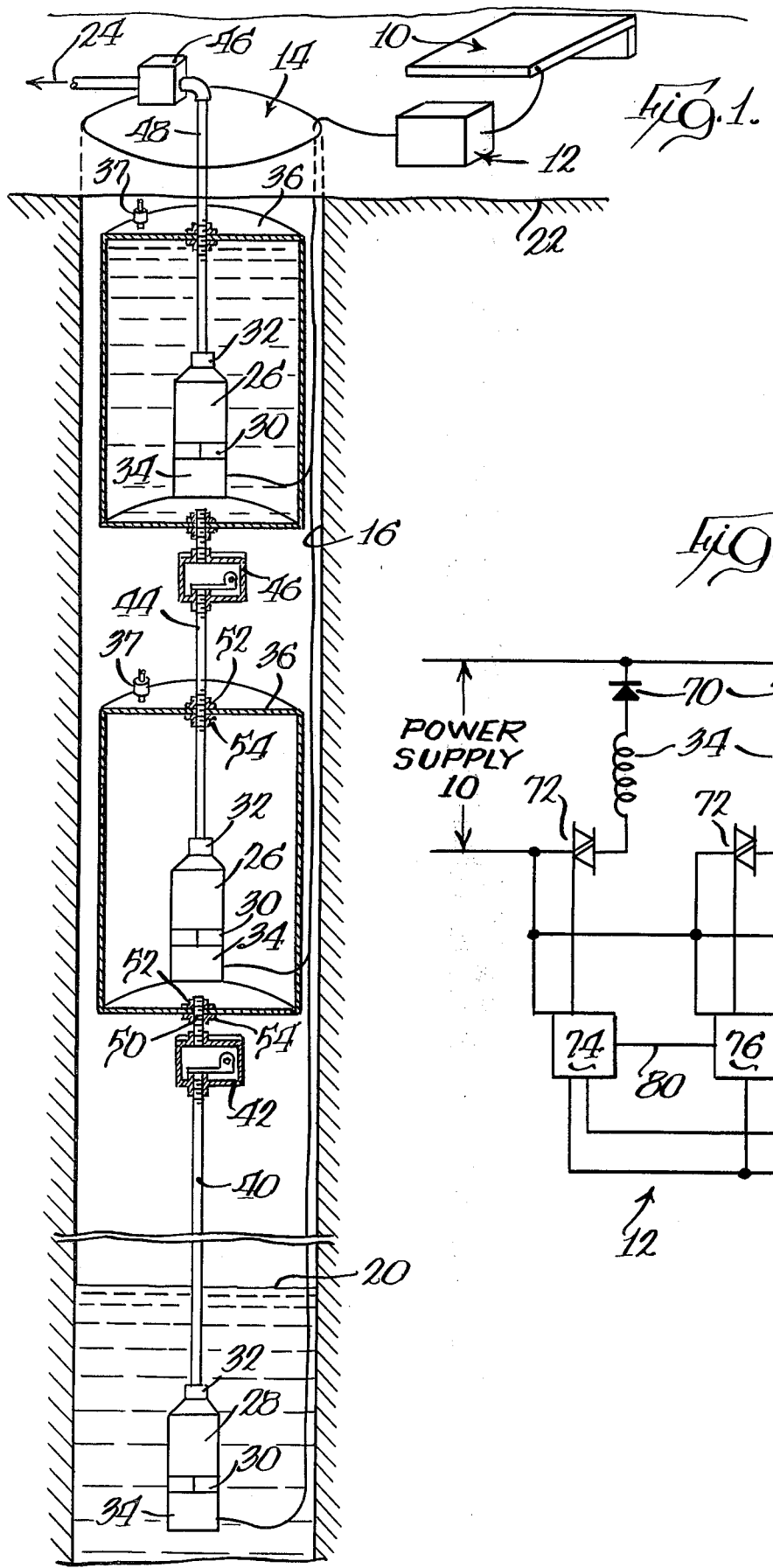
FIG. 1 is a perspective view of a water retrieval system made according to the invention with parts shown in section for clarity.
FIG. 2 is a schematic of a control for the system.

An exemplary embodiment of a liquid retrieval system made according to the invention is illustrated in the drawings and with reference to FIG. 1 is seen to include three principal components. The first is an electrical generator, generally designated 10, of the type which receives naturally occurring energy in wave or kinetic form and converts the same to electrical energy. As illustrated in FIG. 1, the generator 10 is a so-called "solar panel" comprised of a plurality of known photovoltaic cells and which convert wave form energy in sunlight to which the panel may be exposed to electrical energy. In any event, the generator 10 is of limited generating capacity as will be explained in greater detail hereinafter for the purpose of minimizing its size to thereby minimize the number of components required for its fabrication and accordingly minimize its cost.

The second major component of the system is a control, generally designated 12, which receives electrical energy from the generator 10 and controls its application to the third major system component. The third major system component is an in-well pumping structure, generally designated 14 which is adapted to be disposed within a well shaft 16 such that its lower end is in fluid communication with an aquifer 20 or the like well below the level of the ground 22. The component 14 serves to, under control of the control 12, pump water from the aquifer 20 upwardly and out of the well shaft 16 to a suitable point of use as schematically indicated by an arrow 24.

The in-well component 14 of the system is comprised of a plurality of relatively small electric pumps 26 located at intermediate points in the well 16 and a substantially identical lowermost pump 28. The pumps 26 and 28 have inlets 30 and outlets 32 as well as electrical drive motors 34. According to a preferred embodiment of the invention, each of the pumps 26 is disposed within an associated reservoir or tank 36, each of which is sized to be disposed within the well shaft 16 as illustrated. Each reservoir 36 is provided with an air vent 37 whereby air may exit the reservoir to prevent air lock in the system. The lowermost pump 28 does not require a corresponding reservoir 36 in that it is submerged below the water level of the acquifer 20.

The outlet 32 of the lowermost pump 28 is connected via a pipe 40 and a check valve 42 to prevent backflow from the next uppermost reservoir 36. Each of the pumps 26 has its outlet 32 connected via a similar pipe 44 and check valve 46 to the immediately uppermost reservoir 36. The uppermost pump 26 has its outlet 32 connected to a pipe 48 and check valve 46 which may be utilized to direct retrieved water to the point of use as indicated by arrow 24.

It will be observed that the pipe 40 opens into the lower end of the connected reservoir 36 as does the pipe 44. It will further be noted that at points where the pipes 40, 44 and 48 enter into or extend from the reservoirs 36, they are threaded as at 50 and collars 52 and 54 threaded on the threads 50 sandwich the corresponding wall of the reservoir 36 to provide a substantially rigid structure. In this way, the pipes 40, 44 and 48 serve as a support for the pumps 26 within their respective reservoirs 36 as well as a suspending device for all lower pumps 26 and 28 and reservoirs 36. In other words, the conduit system is the essential support for the stacked assembly of pumps and reservoirs as shown in FIG. 1. Obviously, however, if desired, supports other than conduits could be used.

As mentioned, the electrical demand of each of the motors 34 for the pumps 26 and 28 is chosen not to exceed the generating capacity of the generator 10. And the disposition of the pumps and reservoirs within the well shaft 16 is such that each pump, operating to its capacity, can deliver water from the aquifer 20 or its associated reservoir 36 as the case may be to the next higher reservoir 36 to substantially fill the same. And in general, no one of the pumps, when operating at capacity, will be sufficient to deliver water from the aquifer 20 to exit the well at arrow 24 solely on its own as would be the case if a single pump were used.

Consequently, the electrical demand of each pump 26 or 28 will be considerably less than that required by a single pump utilized to elevate water the same distance. This in turn allows the generator 10 to have limited generating capacity as stated previously.

In order to elevate water to exit the well shaft 10, the control 12 is utilized to insure that electrical demand by one or more pumps 26 and 28 does not exceed the generating capacity of the generator 10. While this can be accomplished in a variety of ways, a relatively simple control system in the form of an electric circuit is shown in FIG. 2.

The legend "power supply" corresponds to the generator 10, and possibly other equipment such as batteries used as an auxiliary power source. One side of the power supply is connected via blocking diodes 70 in parallel to each of the pump motors 34. The opposite side of the power supply is connected via conventional triacs 72 to the opposite side of the pump motors 34, also in parallel.

Each triac has a line connected to receive a gate signal from a corresponding timer 74, 76 or 78. Each of the timers 74, 76 and 78 are of conventional construction and are connected across the power supply as indicated. In addition, the timer 74 has a connection 80 to the timer 76 while the timer 76 has a connection 82 to the timer 78. The timer 78, in turn, has a connection 84 to the timer 74. Each of the timers 74, 76 and 78 are constructed so as to deliver a gate signal to the corresponding triac 72 over a predetermined time period which will be selected to have a length corresponding approximately to the time required for a given pump 26 to fill the immediately uppermost reservoir 36. The timers 74, 76 and 78 are further arranged such that when the timer 74 is applying a gate signal to its associated triac during the timing period, there will be no initiation signal placed on line 80 to the timer 76 so the latter will be acquiescent. The timer 74 will only provide such a signal when it has timed out and after a short time delay whereupon the timer 76 will issue a gate signal to its associated triac 72. When the timer 76 has timed out, and after a short delay, it will provide an initiation signal on the line 82 to cause the same occurrence in the timer 78 with the same results. And when the timer 78 has timed out, it will feed initiation signal on the line 84 to the timer 74 to repeat the process.

As an example of operation of the system, it may be first considered the timer 74 is associated with the lowermost pump 28 shown in FIG. 1 while the timer 76 is associated with the lowermost one of the two pumps 26. The timer 78 is associated with the upper pump 26.

Initially, assuming that the timer 74 is enabled as a result of a signal on the line 84 received from the timer 78 during a preceding cycle, it will send a gating signal to the associated triac 72 which will allow electrical energy from the power supply to flow to the motor 34 for the pump 28. At this time, the timers 76 and 78 will not provide gating signals to their associated triacs and accordingly, their associated pumps will be inoperative. The pump 28 will therefore pump water from the aquifer 20 to the lowermost reservoir 36 over the period of operation of the timer 74 which, as mentioned, should be sufficient to allow the reservoir 36 to be substantially filled. At this point, the timer 74 will time out removing the gate signal to its associated triac 72 terminating operation of the pump 28. After a short delay, an initiation signal will be placed on the line 80 to the timer 76 which in turn will place a gating signal on its associated triac 72. The lowermost one of the pumps 26 will now be energized and it in turn will pump water accumulated in its associated reservoir 36 to the immediately uppermost reservoir 36. Timing out will occur and ultimately, the lowermost one of the pumps 26 will be de-energized, and the timer 78 enabled by an initiation signal on the line 82. This in turn will result in the timer 78 applying a gate signal to its associated triac 72 with the consequence that the uppermost one of the pumps 26 will begin to operate to pump water from its reservoir 36 which has accumulated there as a result of the sequence out of the pipe 48 in the direction of the arrow 24 to the point of use.

Once the timer 78 times out, the uppermost one of the pumps 26 will cease operating and, after a short delay, an initiation signal placed on the line 84 to the timer 74 to repeat the process.

The control system components may be duplicated for as many pumps as are included in the system and it will be seen that at no time is the total electrical demand of the pumping system greater than the generating capacity of the generator 10 by reason of the matching of the electrical motor's 34 demand to such generating capacity.

Of corse, it should be understood that a variety of peripheral components (not shown) may be employed if desired. For example, float switches or liquid level controls might be utilized instead of timers having predetermined time periods to control operation of the various pumps. Additionally, a float switch or liquid level control may be utilized to disable the entire system when all reservoirs 36 are full and there is no demand for water at the point of use. While it is most economical to store the water obtained from the unique low-powered pumping system, it is also contemplated that an auxiliary power supply such as a battery and suitable regulator may be utilized in connection with the generator 10 for storing electrical energy generated by it in excess of that required to drive the pumps. In this respect, it will be appreciated that the actual electrical output of the generator 10 will vary dependent upon the intensity of energy received by it. Thus, where a solar panel is used, the invention contemplates that there will be excess energy generated on an extremely bright day which excess energy may be stored for use on, for example, a cloudy day when generating capacity is at a minimum or might even be somewhat insufficient to drive any given one of the motors 34.

Thus, the precise form of the control circuit utilized may vary considerbly from that shown in FIG. 2 and still be within the contemplation of the invention so long as it is such that it controls the operation of a plurality of relatively small pumps stacked substantially vertically in a well shaft and with a generator of limited capacity so as to achieve a substantial reduction in the cost of the generator over that which would be required to operate a single pump that would elevate water the entire length of the well shaft 16.

The economic advantage is sizable. Considering the use of a photovoltaic generator as the generator 10, present prices range from $10 to $20 per peak watt of output. Thus, for a well requiring a standard one horsepower submersible pump to perform the entire elevation of the water to the exterior of the well, $16,000 to $32,000 would be required strictly for the cost of the generator. However, utilizing the pumping system of the present invention, and considering, for example, the use of four ¼ horsepower pumps for example, generator costs would be reduced by ¼ to about $4,000 to $8,000 while the cost of the pumps would rise from approximately $200-$400 for one 1 horsepower submersible pump to approximately $400-$800 for four ¼ horsepower pumps. Thus, a savings in the range of $12,000-$24,000 can be obtained at a cost in the range of $200-$400 through the use of the invention at present prices.

That facet of the invention utilizing plural pumps and associated reservoirs stacked in a well shaft also has application apart from a system wherein such structure is provided with energy for operation from naturally occurring sources as mentioned previously and apart from water recovery. One specific such application is in petroleum recovery. Presently, in many instances, petroleum below the surface must be pumped to the surface. In the usual case, surface pumping jacks operate a mechanical pump disposed at the bottom of the well via a series of connecting rods. However, it has been found that an electrical pump placed in the well can move a far greaterr quantity of petroleum to the surface than can a pumping jack system.

Heretofore, electric pump systems disposed at the bottom of the well for petroleum recovery have utilized single pumps that are electrically driven by motors having ratings in excess of 100 horsepower up to nearly 600 horsepower. Typically, the combined motor and pump unit will have a substantial length. For example, one three hundred horsepower unit in commercial use is believed to have a total length of about 170 feet with a diameter of about 6½ inches so as to fit within the well. Needless to say, custom fabrication required in such long narrow motors is extremely expensive since demand is relatively small in terms of the total number of submersible pumps for all uses commercially available presently. There are available smaller pumps in the range of 5-10 horsepower and of considerably shorter lengths, frequently less than 10 feet, whose use is not limited to petroleum recovery and therefore are built in greater quantities and therefore significantly more economically. Such pumps typically develop sufficient pressure to elevate a fluid such as petroleum a distance in the range of 1,000-1,200 feet.

Thus, the invention contemplates the use of such pumps in connection with associated reservoirs and spaced considerable distances from each other for use in petroleum recovery without regard to the use of particular energy sources. In the typical case of petroleum recovery, the pumps would be driven by electrical motors provided with electrical energy from conventional generating sources and without regard to sequencing of operation in most instances. As with the case of the first described embodiment herein, the lowermost pump in a well would elevate liquid to a reservoir associated with a next higher pump which in turn would elevate the liquid from its associated reservoir to the reservoir associated with the next higher pump, etc. All pumps could be run simultaneously or in any sequence desired so long as their associated reservoir is not empty, and the reservoir associated with the next higher pump is not full.

Because such pumps are more commercially available and more economically fabricated, the use of a system including plural pumps and associated reservoirs made according to the invention is economically competitive with other petroleum pumping systems currently in use. Moreover, because a plurality of pumps are used, and each pump will generate a pressure less than that which would be present in the same well if a single pump were used, conduits and the like employed in the system need not be fabricated with the excessive strength necessary to withstand the much higher pressures encountered in single pump systems providing an additional economic advantage.

We claim:
1. A liquid retrieval system comprising:
   means for receiving naturally occurring energy in kinetic or wave form and for converting said naturally occurring energy to electrical energy and having a preselected maximum instantaneous power output;
   a plurality of relatively small electric pumps each requiring, for operation, electrical energy, the total power requirements of said pumps being greater than said preselected maximum power of said energy converting means;

each pump having an inlet and an outlet;

means for disposing said pumps one above the other in a well or the like with the lowest pump inlet being adapted to be in fluid communication with the ground water in a well or the like with which said system may be used;

a plurality of vertically spaced reservoirs above said lowest pump, each said reservoir being in fluid communication with the inlet of an associated pump and with the outlet of the next lowermost pump; and control means for selectively operating said pumps such that the instantaneous total electrical energy demand of the system does not exceed the instantaneous electrical energy available from said naturally occurring energy receiving means to direct water to the reservoir associated with the next higher pump, whereby said naturally occurring energy receiving means may be of relatively small electrical energy conversion capacity and therefore inexpensive and yet provide for the retrieval of liquid from a relatively deep well or the like.

2. The liquid retrieval system of claim 1 wherein said control means operates said pumps individually and in a serial sequence.

3. The liquid retrieval system of claim 1 wherein said disposing means comprise conduits which additionally establish said fluid communication between said pumps and said reservoirs.

4. The liquid retrieval system of claim 1 further including means for preventing back flow from each reservoir to the next lowermost pump.

5. The liquid retrieval system of claim 1 wherein said receiving means comprise a photovoltaic panel adopted to be disposed in sunlight.

6. A well water retrieval system comprising:

an electrical energy generator of preselected instantaneous generating capacity for generating electrical energy in response to the input of naturally occurring energy in wave or kinetic form;

a plurality of electrically operated water pumps each with an inlet and an outlet and each having an electrical energy demand not in excess of said generating capacity, the total instantaneous electrical energy demand of said plurality of pumps being greater than said preselected instantaneous generating capacity of said generator;

a plurality of water reservoirs each sized to be disposed in a well shaft;

means, including a conduit system, for supporting said pumps and said reservoirs in a well shaft with the pumps and reservoirs stacked substantially vertically and with the outlet of each pump connected to a reservoir higher in the stack and the inlet of each pump connecting with an adjacent reservoir; and control means for operating said pumps selectively such that each pump drives water from its inlet to a next higher reservoir, the total instantaneous electrical energy demand of all concurrently operated ones of said pumps not exceeding said instantaneous generating capacity, whereby the cost of said generator may be relatively low due to its limited capacity.

7. The well water retrieval system of claim 6 wherein all but the lowermost ones of said pumps has a reservoir associated with its inlet.

8. The well water retrieval system of claim 7 wherein each pump with an associated reservoir is disposed within its associated reservoir and said supporting means consist essentially of conduits interconnecting said pumps and said reservoirs.

9. The well water retrieval system of claim 8 wherein said generator is a photovoltaic generator adopted to be exposed to sunlight and said conduit means comprises an electrical timer circuit for sequentially directing electrical energy to said pumps so that no more than one pump is operating at a given point in time.

10. A liquid retrieval system comprising:

a plurality of electric pumps;

each pump having an inlet and an outlet;

means for disposing said pumps one above the other in a well or the like with the lowest pump inlet being adapted to be in fluid communication with the liquid in a well or the like with which said system may be used; and a plurality of reservoirs adapted to be disposed one above the other in a well or the like, said reservoirs being in fluid communication one each with the inlet of each said pump other than that of said lowest pump and with the outlet of the next lowermost pump, said disposing means comprising conduits which additionally establish said fluid communcation between said pump outlets and said reservoirs, said pumps being disposed in said reservoirs.

11. The liquid retrieval system of claim 10 further including means for preventing back flow from each reservoir to the next lowermost pump.

* * * * *